(12) United States Patent
Fiore (10) Patent No.: US 7,066,226 B1
(45) Date of Patent: Jun. 27, 2006

(54) FUEL EFFICIENT VEHICLE TIRE HAVING A VARIABLE FOOTPRINT AND LOW ROLLING RESISTANCE

(76) Inventor: Robert Angelo Fiore, 60 Pease Rd., East Longmeadow, MA (US) 01028

( * ) Notice: Subject to any disclaimer, the term of this patent is extended or adjusted under 35 U.S.C. 154(b) by 0 days.

(21) Appl. No.: 11/209,960

(22) Filed: Aug. 23, 2005

(51) Int. Cl.
*B60C 1/00* (2006.01)
*B60C 11/00* (2006.01)
*B60C 11/18* (2006.01)

(52) U.S. Cl. .................... 152/208; 152/209.5; 152/210
(58) Field of Classification Search ................ 152/208, 152/210, 209.5
See application file for complete search history.

(56) References Cited

U.S. PATENT DOCUMENTS

| | | | | |
|---|---|---|---|---|
| 2,708,470 | A * | 5/1955 | Gramelspacher | 152/208 |
| 3,942,572 | A * | 3/1976 | Crandall | 152/208 |
| 4,748,199 | A | 5/1988 | Takiguchi et al. | |
| 6,513,561 | B1 | 2/2003 | Bernstorf et al. | |
| 6,564,839 | B1 * | 5/2003 | Manne et al. | 152/209.14 |
| 6,624,233 | B1 | 9/2003 | Amaddeo et al. | |
| 2004/0118495 | A1 * | 6/2004 | Sandstrom et al. | 152/209.5 |
| 2005/0092411 | A1 * | 5/2005 | O'Brien | 152/210 |

FOREIGN PATENT DOCUMENTS

| | | | |
|---|---|---|---|
| DE | 2345239 | * | 3/1975 |
| GB | 357419 | * | 9/1931 |
| JP | 58-118404 | * | 7/1983 |
| WO | WO 90/15725 | * | 12/1990 |

* cited by examiner

*Primary Examiner*—Steven D. Maki (57) ABSTRACT

A tire for vehicles offering low rolling resistance wherein the ground-contact surface area is variable as a portion of the tread part can be retracted and/or extended using pneumatic, mechanical or hydraulic force to withdraw from, or come into contact with the road surface before, during or after operation permitting more efficient operation wherein the material used within the tread part that retains contact with the road may generally have a smaller internal friction loss than the material used in conventional tires and the rolling resistance is thereby reduced when the retractable portion of the tread is selectively withdrawn from contact with the road surface furthermore achieving a smaller ground-contact patch footprint. The achieved object of a tire with a lower rolling resistance yields improved fuel consumption efficiency. Improvements in exterior and interior noise levels and a reduced tendency to exhibit hydroplaning action are also attained with a variable groove volume to tread surface-contact ratio. Within one embodiment of the present invention, an automated microcomputer-based tire control system is disclosed useable to command the motion of the moveable tread portion of the said tire in response to various operational scenarios.

6 Claims, 5 Drawing Sheets

FUEL EFFICIENT VEHICLE TIRE HAVING A VARIABLE FOOTPRINT AND LOW ROLLING RESISTANCE

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND OF THE INVENTION—FIELD OF THE INVENTION

The present invention relates to a tire for vehicles and, more particularly, to a pneumatic tire in which the loss of energy caused by internal frictions between constituents of the tire caused by a deformation of the tire during running is diminished by an action of withdrawing a portion of the tread comprised of materials exhibiting different elastic modulus, from contact with the road surface during operations and running on a smaller ground contact patch area supported by relatively harder tread materials leading to a reduction in the rolling resistance of the tire and the tendency to hydroplane during wet operations.

BACKGROUND OF THE INVENTION

To cope with the global demand for energy efficiencies in the transportation industry, various approaches have been employed in order to reduce the rolling resistance of a vehicle tire in an attempt to decrease the specific rate of hydrocarbon-based fuel consumption of automobiles and trucks. The rolling resistance of a tire can effectively be reduced by diminishing the internal friction loss caused by a deformation of a tire during running. A known measure for diminishing the internal friction loss is to use higher density rubber materials in tire construction having a characteristic of a smaller internal friction loss comprising the material of the cap tread of the tire.

The low level of the internal friction loss of the above mentioned rubber material, however, seriously affects general characteristics of the tire such as braking performance, steering performance, comfort, wear-resistant properties and so forth. For instance, if a more dense rubber having a small internal friction loss is used to reduce the rolling resistance of the tire during running, various unfavorable phenomena are caused during high-speed cruising on a wet road, such as an increase of braking distance, deterioration of the control stability, degraded comfortableness, reduced wear resistance and so on. These characteristics are quite undesirable for a tire.

Conventionally, the cap tread of the tire has been constituted by a rubber which inherently has a large internal friction loss in order to improve the above-mentioned characteristics of the tire such as ride comfort. The attempt to reduce the rolling resistance of the tire by diminishing the internal friction loss, therefore, is inevitably accompanied by a certain degradation of desirable tire characteristics. Henceforth, there exists conflicting design tradeoff in the conventional construction and design of a tire that limits both the performance characteristics and the extent of fuel efficiency.

It is therefore, a general object of the present invention to supercede the current tire design limitations. A prime object of the invention is to provide a pneumatic tire having a reduced rolling resistance, while reducing conflicting design and performance tradeoffs and improving on the above-described problems of the prior art.

It is a primary object of the present invention to provide a vehicle tire liberated of certain conventional design limitations by providing for a variable ground contact patch, a moveable tread portion and the employ of rubber components exhibiting different densities within or around each of the defined separate tread portions. Henceforth, the disclosed tire invention is capable of improving the wet grip performance without affecting the dry grip performance, while increasing the fuel efficiency of the vehicle.

SUMMARY OF THE INVENTION

A vehicle tire is disclosed as having at least two tread portions. In one embodiment, one portion of the tread is constructed to remain in contact with the road surface, while another portion is constructed in a manner to allow it to be withdrawn from contact with the road surface before, during or after operation.

In one embodiment of the present invention, it is anticipated that the tread portion intended to remain in contact with the road surface is comprised of at least two ground-contact patches. It is anticipated that these non-moveable tread portions be located near each shoulder of the tire. The total width of all the non-moveable tread may comprise 60% to 90% of the total width of the tire's tread surface.

The other tread portion is made to be selectively moveable in relation to the remainder of the tire. The moveable tread portion may be centered near the equatorial plane of the tread and made to be moveable in a direction that lifts the moveable tread away from contact with the road surface. This tread movement is anticipated to be in a direction towards, and away from the hub of the wheel. The moveable tread portion may have a tread width comprising ten to twenty percent of the total tread width. In one embodiment of the invention, the moveable tread portion centered nearest the equatorial plane of the tire may be comprised of materials with a lower elastic modulus relative to the average elastic modulus of the non-moveable tread portion and when in contact with the road, the softer moveable tread portion offers good levels of ride comfort and excellent braking capabilities.

According to the invention, a rubber material having a visco-elastic property of relatively small friction loss and high elastic modulus is disposed in or around the non-moveable tread portion areas, which remain in contact with the road surface. A rubber material having a visco-elastic property of relatively high friction loss and low elastic modulus is disposed in or around the moveable tread portion, which can be withdrawn from contact with the road surface. By so doing, it is possible to remarkably reduce the average rolling resistance of the tire during running, without suffering a degradation of tire characteristics at high-speed cruising or during running on wet road, such as an increase of braking distance, deterioration of control stability, degradation of comfortableness and reduction of wear resistance.

The moveable tread portion has expandable voids located underneath the tread surface and within the crown of the tire.

These voids are in communication with sources of pneumatic, mechanical or hydraulic pressure sources and the said voids can be made to increase or decrease in volume. When pressurized, the voids expand and the moveable tread portion is made to come into contact with the road surface. When relaxed, depressurized or when vacuum is supplied to the voids, the said voids contract and the moveable tread portion is withdrawn from contact with the road.

In one embodiment, it is anticipated that the moveable tread portion is constructed and molded in such a manner that it is normally withdrawn from contact with the road surface unless the said voids are pressurized. In another embodiment, the withdrawal of the moveable tread portion from contact with the road surface is dependent on reduced pressure or a vacuum source being supplied to the expansion voids.

When operational scenarios are encountered where enhanced fuel efficiency is desired and braking is not anticipated, the moveable portion of the tread is selectively caused to withdraw from contact with the road surface. This occurs when voids contained within the crown are made to contract or shrink allowing the moveable tread directly adjacent to the voids to lose contact with the road. It is anticipated that the moveable tread portion may be withdrawn from contact with the road surface by a small distance, generally less than three centimeters. The moveable tread portion is normally withdrawn from contact with the road surface when the vehicle is cruising at highway speeds and enhanced fuel efficiency is desired.

As the moveable portion of the tire is withdrawn from the road, the weight of the vehicle is placed on the now smaller ground-contact patch of the footprint surface area and because the said ground-contact patch area offers less contact friction and as this portion of the tire may be comprised of harder materials, the average rolling resistance is reduced and fuel efficiency increased. In real terms, additional effective "groove space" is created by the selective withdrawal of the moveable tread portion and water backpressure is reduced if standing water is encountered during operation. Henceforth, the tendency of the tire to hydroplane is reduced.

When acceleration or deceleration is desired or anticipated, the expansion voids are made to be selectively expanded and the moveable portion of the tread so comprised of material with a relatively low elastic modulus is made to come into contact with the road. The friction offered by the larger ground-contact patch area and the softer material creates additional braking and steering capabilities. The disclosed system may allow for an overall wider tire footprint than commonly allowed with conventional tire construction. The use of relatively elastic tread materials within the moveable tread portion allows the expansion of the voids with little effort, to permit the effective movement and extension of the moveable tread portion.

Control of the Moveable Tread Portion

In the present invention, the moveable tread surface is made to withdraw from, or to come into contact with, the road surface in order to enhance fuel efficiency, braking, or to delay the onset of hydroplaning as the operational scenario may warrant.

Manual selection input (a switch) may direct the extension or retraction of the moveable tread portion, however a micro-computer based tire control system is disclosed, wherein a system of sensors detects forces and notes current operational requirements and conveys electronic signals regarding lateral and/or longitudinal acceleration forces, braking status, vehicle velocity and tire pressures into a digital microprocessor. Software contained within the microprocessor is comprised of a logic decision algorithm capable of deciding if the moveable tread portion should be retracted from, or remain in contact, with the ground in order to meet the requirements of the current or predicted operational scenario. Digital electronic signals are directed from the microprocessor to activate a series of devices selected from the group of solenoids, valves and actuators that control movements in the moveable tread portion.

If the tire control logic system or the operator anticipates that the handling characteristics of the vehicle require enhancement, and the total ground-contact area should be increased for braking stability or control, the control system will command increased pressure to be directed to the expansion voids located within the crown of the tire. Volumetric expansion of the said voids will force the moveable tread portion of the disclosed tire to come into contact with the road surface and the tire would then afford improved braking and cornering characteristics.

If the tire control system or operator detects an operational scenario where minimal acceleration forces are anticipated and improved fuel economy is desired, the tire control system will command lower pressure to be directed to the expansion voids and the moveable portion of the tread will withdraw from contact with the road surface. The resulting smaller effective ground-contact surface area combined with rolling effectively with a more dense tread material, will reduce rolling resistance and increase fuel efficiency.

In order to meet a social demand for enhanced levels of safety performance, ABS (Antilock Braking System or a system for preventing the wheels from locking during sudden braking) tends to be installed on recently manufactured vehicles. In one embodiment of the present invention, digital signal output from the said ABS braking systems may be used to monitor circumferential acceleration and braking requirements and be employed as either the disclosed tire control system itself or as digital data signal input to the described tire control system.

The said expansion voids may be comprised of embedded tubes installed within the tire crown in a circumferential direction during molding and construction of the tire crown or as empty areas among the layers of ply as the layers of tire ply are added to the crown during lay-up.

BACKGROUND OF THE RELATED ART

An industry standard pneumatic tire has circumferential grooves and a ground contact-patch that is nearly constant in area during operation. With this limitation, it becomes difficult to satisfy requirements to enhance the performance of the tire, such as road grip performance in wet conditions, steering stability during cornering, and especially improved fuel consumption.

In the field of tire production, the main object of research is that of obtaining an optimum compromise between, on the one hand, the tire rolling resistance—which should be reduced to the minimum—and on the other hand, the characteristics of handling and comfort of the tire. This object is particularly difficult to achieve as the engineer faces the constraint of a nearly constant ground-contact footprint area. Attempts to increase fuel efficiency usually center on changes in material composition or the construction of the tire. Typically, tire engineers attempt to reduce the rolling resistance by using a higher density material or to strengthen the body or ply cords of the tire.

An example of such work is outlined in U.S. Pat. No. 6,513,561 issued to Bernstorf, et al teaching a pneumatic tire having multiple modulus body cords to reduce rolling resistance. U.S. Pat. No. 4,748,199 issued to Takiguchi, et al teaches the altering of the chemical components of the tire construction to reduce fuel consumption. U.S. Pat. No. 6,624,233 issued to Amaddeo, et al discloses a low-rolling resistance tire predicated on an improved belt structure. No known prior art teaches the advantage of the present invention of a variable ground-contact patch area obtained by withdrawing a portion of the tread of a tire from the road surface while in operation or not.

BACKGROUND OF THE INVENTION—OBJECTS AND ADVANTAGES

Objects of the present invention are reduced specific gas consumption, reduced rolling resistance, increased effective dry traction, increased traction during wet operation, reduced tendency to hydroplane during wet operations, and increased traction and directional control during wet, snow and ice operation. Lower drag and rolling resistance during high-speed operations permits the installation of a smaller capacity engine that in turn, allows the vehicle to obtain sufficient highway speeds with reduced specific fuel consumption during both city and highway driving. Some of the more important objects are stressed below.

Fuel Economy

To cope with the current demand for reduction in hydrocarbon resource consumption, the present invention has a prime object of reducing the rolling resistance of the disclosed tire in order to decrease the rate of fuel consumption of vehicles.

As hydrocarbon resources become less plentiful, society demands greater fuel efficiencies in transportation industries. Fuel efficiency is dependent on weight, drag, engine efficiency and the rolling resistance of the tires used. Improvements in one area may not have significant impact on fuel economy unless the other constraining or limiting factors are also similarly improved. A "smart tire" as disclosed within, offering lower rolling resistance, which will encourage engineering improvements in other vehicle engineering areas in order to achieve greater total specific fuel efficiency.

One significant method in which overall energy efficiency can be improved is by using a low-rolling resistance tire design. While tire material and tread design are an important part of the low rolling resistance equation, one of the largest factors is to reduce the amount that the tire deforms as it rotates. This continual deformation while rolling wastes a significant amount of energy. Normally, harder material or greater inflation pressures are employed in order to achieve lower rolling resistance but there are limits to this approach. The present invention allows the use of harder materials in the crown portion of the tread that will remain in contact with the road thereby yielding less road friction and less deformation when the moveable tread portion of the tire is selectively retracted from contact with the road.

A vehicle's fuel economy is the result of its total resistance to movement. This includes overcoming inertia (Newton's Law), driveline friction, road grades, tire rolling resistance and air drag. The relative percent of influence that these factors represent during stop-and-go city driving are very different from steady, state highway driving. During stop-and-go city driving, it's estimated that overcoming inertia is responsible for about 35% of the vehicle's resistance. Driveline friction is about 45%; air drag is about 5% and tire rolling resistance is about 15%.

Overcoming inertia no longer plays an appreciable role in the vehicle's resistance during steady speed highway driving. For those conditions it is estimated that driveline friction is about 15%; air drag is about 60% and tire-rolling resistance represents about 25%.

It is generally thought that a 10 percent reduction in the rolling resistance would yield a fuel saving of approximately 2%. Henceforth, to calculate the potential savings in Miles Per Gallon (MPG) resulting from using tires of the disclosed invention in place of Original Equipment tires, we would multiply the tire's percentage of influence in the vehicle's overall resistance (15% in the city and 25% on the highway) times the estimated percentage reduction in rolling resistance and then apply the percentage reduction to the original MPG.

It is estimated that the disclosed invention will reduce tire-rolling resistance by 20%. For automobiles, a 20% reduction of the 25% total drag highway contribution due to tire rolling resistance would yield; 0.25×0.20=0.05 or a 5% reduction in fuel consumption. In a vehicle that has a MPG highway rating of 30 MPG, the savings would yield a vehicle with a MPG highway rating of; 1−0.05=0.95×30 MPG=28.5 MPG.

Fuel savings for city driving conditions are similar in scope. Fuel savings due to the installation of smaller engines in response to a reduction in rolling resistance are in addition. Fuel savings for truck transport in long-distance, high-speed operations are even more robust.

A 5% fuel saving is significant as there are over 160 million passenger cars and light trucks in America, and at least 126 billion gallons of gasoline are consumed per year. A 5% fuel consumption reduction may eliminate the consumption of approximately; 126 billion×0.05=6.3 billion gallons of hydrocarbon fuel saved per year. Savings in other countries would be additional.

Additionally, Federal law mandates that vehicle manufacturers meet fuel efficiency targets for the fleets they manufacture. Vehicle manufacturers have achieved at least a 50 percent reduction in rolling resistance in recent years in order to meet federal fuel economy standards for manufacturer's fleets. The disclosed invention will help vehicle manufacturers meet more strict government guidelines.

Hydroplaning Resistance

Hydroplaning of tires on wet pavement has long been a problem in the art. A tire hydroplanes when operating on wet pavement because the tire pushes water in front of it as it advances until the backpressure of the water is sufficient to lift the tire off the road. The pressure of the water is a function of the depth of the water, tire pressure, tire groove volume and the speed of the tire. The driver loses steering control of the vehicle as the tire hydroplanes, and many driving related deaths are attributed to hydroplaning phenomena.

Various tire designs, adapted to channel water away from the tire, and thereby maintain rubber contact with the road have been tried by the prior art in order to correct this problem. Although prior art tire designs have improved wet traction, it is a continuing goal in the art to further improve wet traction.

With the present invention, traction on wet pavement, and through standing water, can be improved by selectively moving a portion of the tread away from the road surface. The selective retraction of a portion of the tire tread from contact with the road surface as disclosed wherewith, allows the vehicle weight to be placed on a smaller effective ground-contact area and increases the weight per ground-contact area thereby increasing effective surface friction. This improvement, along with a reduction in the frontal area of the tire-ground contact region, a corresponding increase in the effective volume of tire groove area as the moveable-portion of the tread is withdrawn from contact with the road surface, all serves to reduce the backpressure of water as the tire rolls through water. Henceforth, hydroplaning action is reduced or delayed when the moveable portion of the tread is withdrawn from contact with the road surface.

DEFINITIONS

"Bead" means that part of the tire comprising an annular tensile member wrapped by ply cords and shaped to fit the design rim.

"Carcass" means the tire structure apart from the belt structure, tread, undertread, and sidewall rubber over the plies, but including the beads.

"Ground Contact Patch" refers to a section of footprint, in a footprint that is divided into sections by wide void areas, that maintains contact with the ground during operation.

"Crown" refers to the circumferentially outermost portion of the carcass substantially within the width limits of and including the tread.

"Equatorial Plane (EP)" means the plane perpendicular to the tire's axis of rotation and passing through the center of its tread.

"Footprint" means the maximum ground contact patch or area of contact of the tire tread with a flat surface at zero speed and under design load and pressure.

"Groove" means an elongated void area in a tread that may extend circumferentially or laterally about the tread in a straight, curved, or zig-zag manner. Grooves ordinarily remain open in the tire footprint. Grooves may be of varying depths in a tire.

"Operation" means prior to, during, or after the running or movement of the vehicle.

"Pneumatic Tire" means a laminated mechanical device of generally toroidal shape (usually an open-torus) having beads and a tread and made of rubber, chemicals, fabric and steel or other materials. When mounted on the wheel of a motor vehicle, the tire through its tread provides traction and contains the fluid that sustains the vehicle load.

"Radial" and "Radially" are used to mean directions radially toward or away from the axis of rotation of the tire.

"Shoulder" refers to the upper portion of sidewall just below the tread edge.

"Sidewall" means that component which comprises a portion of the outside surface of a tire between the tread and the bead.

"Tread" means a molded rubber component which, when bonded to a tire casing, includes that portion of the tire that comes into contact with the road when the tire is normally inflated and under normal load.

"Tread Width" means the arc length of the road contacting tread surface in the axial direction, that is, in a plane parallel to the axis of rotation of the tire.

DRAWINGS—REFERENCE NUMBERS

10 tire
12 circumferential grooves
14 crown tread
16 tire shoulder
18 moveable tread portion
20 non-moveable tread portion
22 expansion voids
24 pressure conduit
26 tire control system
28 supportive belt ply
30 hard rubber material
32 soft rubber material
34 bead
36 total footprint width
38 ground contact patch of the non-moveable tread portion
40 ground-contact patch of the moveable tread portion
42 groove space
44 road surface
46 pressure/vacuum source
48 solenoid valves
50 micro-computer
52 wheel acceleration sensors
54 ABS (Antilock Braking System)
56 manual input to the tire control system

DETAILED DESCRIPTION OF THE INVENTION

Some preferred embodiments of the present invention can be understood with reference to FIGS. 1–5. Like numbers in the Figures refer to like elements.

Figure 1:
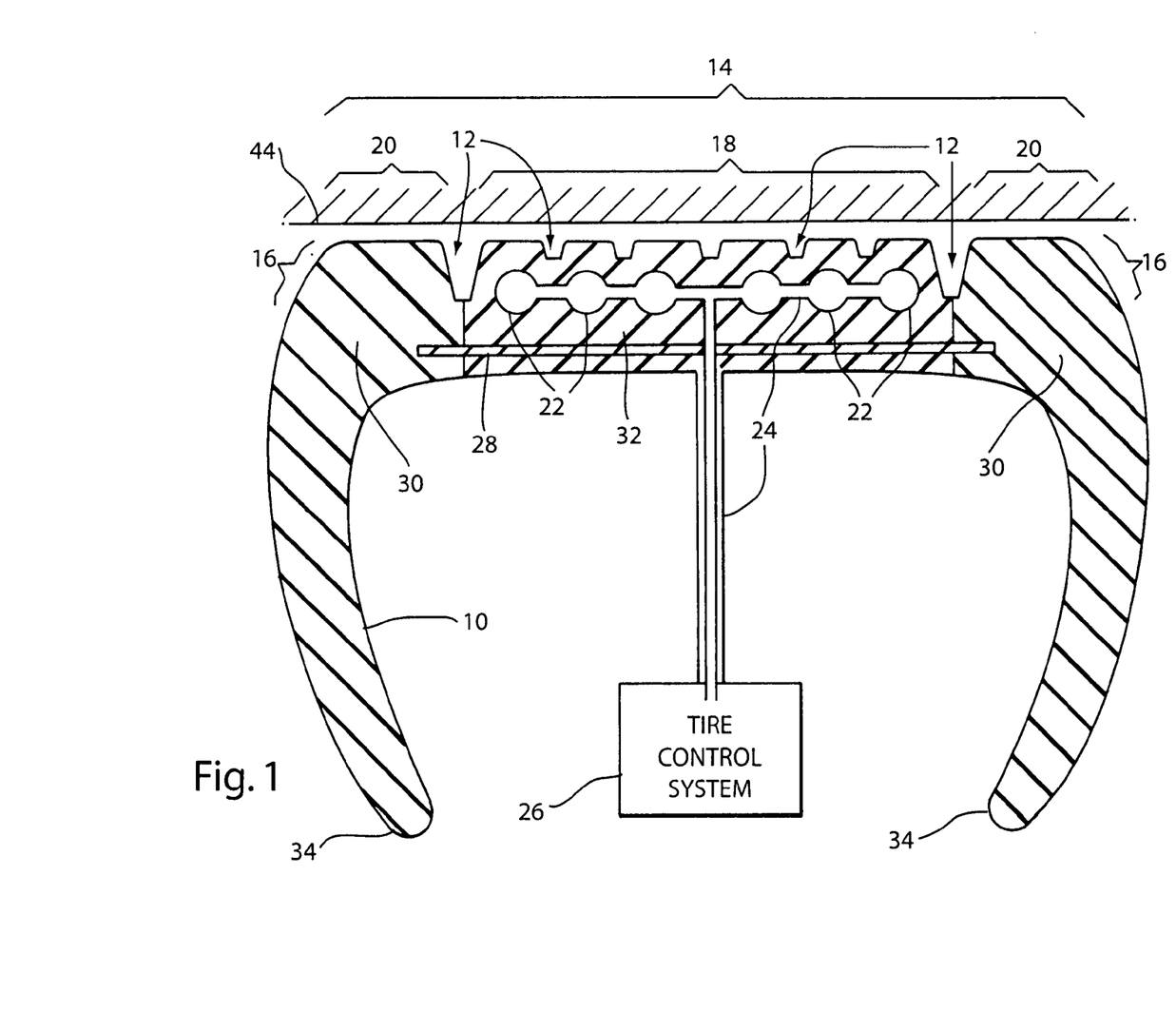
FIG. 1 is a cross sectional view of the inventive tire in accordance with an embodiment of the invention with the moveable portion of the tread extended to come into contact with the road surface.

The tire (10) in FIG. 1 is in the "extended" position whereas both the non-moveable tread portion (20) and the moveable tread portion (18) are in contact with the road surface (44). A tire (10) comprises circumferential grooves (12), a crown tread portion (14), a pair of tire shoulder parts (16), a moveable tread portion (18) generally comprised of softer rubber materials (32) in relation to the non-moveable tread portion and a pair of non-moveable tread portions (20) generally comprised of harder rubber compositions (30) in relation to the moveable tread portion wherein the moveable tread portion (18) and the non-moveable portions (20) are divided by circumferential groves (12). A series of expansion voids (22) are located within the moveable tread portion (18). Expansion voids (22) extend circumferentially within the tire's tread. The expansion voids (22) are generally located in the crown structure between the supportive belt ply (28) layers and the tread surface. These expansion voids (22) are in communication with a pressure conduit (24) which is also in communication with a pressure or vacuum source (44) controlled through the said tire control system (26) wherein the tire control system (26) controls the amount of pneumatic or hydraulic pressure selectively supplied to the expansion voids (22) located within the moveable portion of the tire tread causing the moveable tread portion (18) to extend or retract to come into contact with, or withdraw from, the road surface (44). Conduits (24) within the tread communicate pressure from void (22) to void (22).

The tire (10) of the invention may be viewed as having a crown tread (14), which comprises two tread types. One type is moveable tread and the second type is non-moveable. The preferred embodiment of the invention is comprised of a pair of non-moveable tread portions (20). One segment of moveable tread portion (18) is disposed between the two said non-moveable portions (20), wherein each tread portion is usually separated by circumferential grooves (12). In the tire (10) of the invention, the width of each of the non-moveable portions (20) comprise 10% to 45% of the total crown tread (14) and the moveable tread portion (18) may comprise 10% to 80% of the total crown tread (14). In the preferred embodiment, the two non-moveable portions (20) comprise a total of approximately 90% of the total tread width and the center moveable tread portion comprises about 10% of the total tread width.

Clearly, additional sections of non-moveable tread portions (20) or moveable tread portions (18) may be included in the invention or the tread types may be in different locations along the crown tread. Pressure as communicated from the pressure source (46) as communicated through the tire control system (26) may be used to move pistons that would convert pneumatic or hydraulic pressure into mechanical action further moving the moveable portion of the tread (18). Additional non-moveable tread portions (20) or moveable tread portions (18) may be symmetrically or asymmetrically disposed along the width of the crown tread portion (14).

Figure 2:
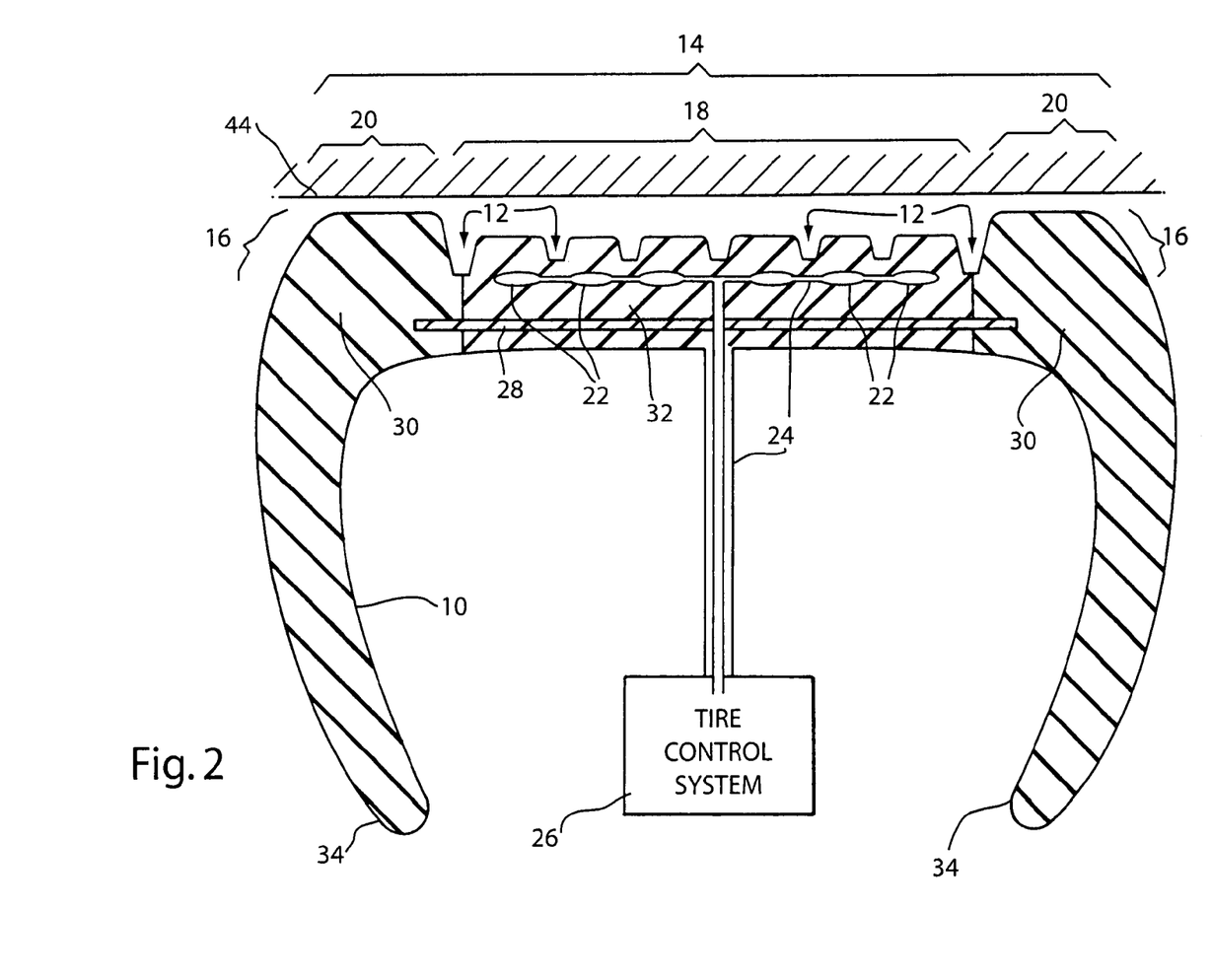
FIG. 2 is a cross sectional view of the inventive tire in accordance with an embodiment of the invention with the moveable portion of the tread retracted and withdrawn from contact with the road surface.

The tire (10) in FIG. 2 is in the "retracted" position whereas the non-moveable tread portions (20) are in contact with the road surface (44) and the moveable tread portion (18) is selected to be withdrawn from contact with the road surface (44). In this mode, the tire control system has commanded less pressure or vacuum to be supplied to the pressure conduit (24) which is in communication with the expansion voids (22) located within the moveable tread portion (18). The reduced pressure causes the said expansion voids (22) to contract and the moveable tread portion (18) to withdraw from the road surface (44). In this mode of operation, the weight of the vehicle is supported solely by the non-moveable tread portions (20). The non-moveable tread portions (20) are generally comprised of harder materials and exhibit less elastic deformation during operations and offer less rolling resistance. A smaller ground-contact patch, additional weight per area of ground-contact and diminished tread frontal area allow additional resistance to the back pressure created by running in wet or standing water, thus the hydroplaning phenomenon is averted or prevented and the wet performance is increased.

Figure 3:
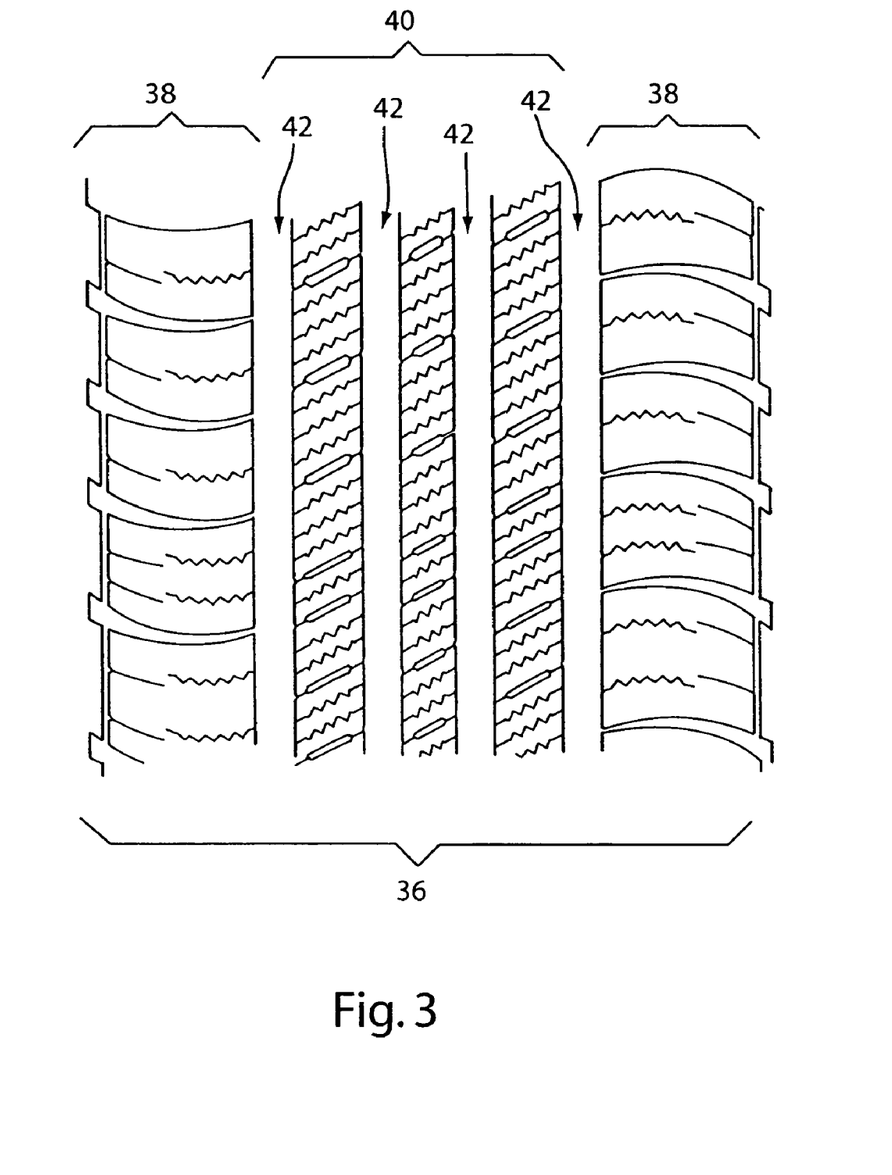
FIG. 3 is a plan view representation of the ground-contact patch of the tire with representative tread according to a specific embodiment of the present invention with the moveable portion of the tread extended and in contact with the road surface.

When in contact with the road surface (44) the moveable tread portion (18) gives rise to a moveable tread portion ground contact patch (40). When in contact with the road surface (44) the non-moveable tread portion (20) gives rise to a non-moveable tread portion ground contact patch (38). FIG. 3 is a plan view representation of the footprint patch (36) of the tire (10) according to the tire being in the "extended" mode of operation as depicted in FIG. 1, whereas the moveable tread portion (18) is selected to be extended and in contact with the road surface (44) which yields a ground contact-patch of the non-moveable tread portion (38) and a ground-contact patch of the moveable tread portion (40). Since both the moveable tread portion (18) and the non-moveable tread portions (20) are in contact with the road (44), the total ground-contact patch area is approximately equal to the area of the footprint (36) and the tire offers maximum traction.

Figure 4:
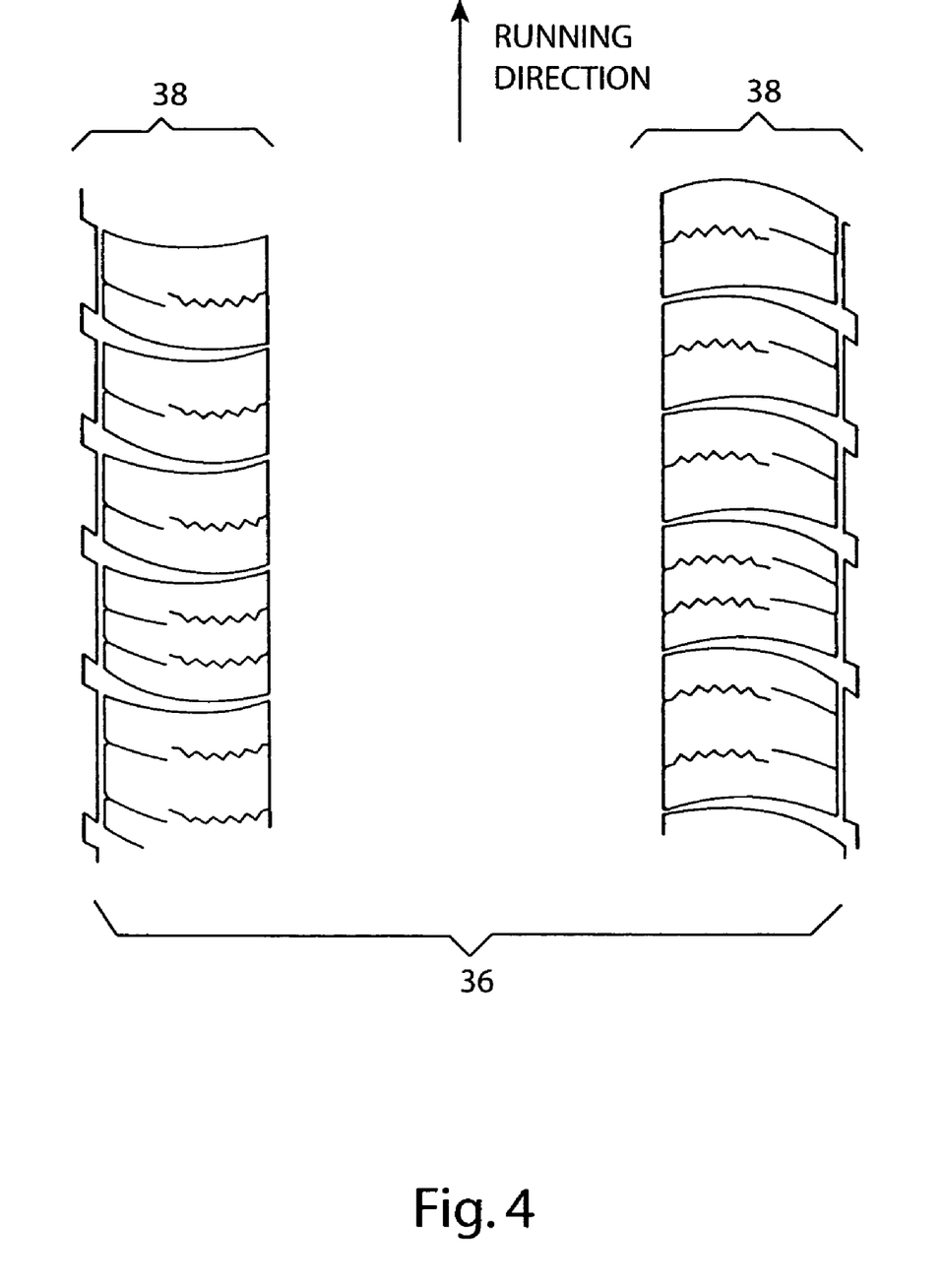
FIG. 4 is a plan view representation of the ground-contact patch of the tire with representative tread according to a specific embodiment of the present invention with the moveable portion of the tread retracted and withdrawn from the road surface.

FIG. 4 is a plan view representation of the footprint patch (36) of the tire (10) according to the mode of operation as depicted in FIG. 2 wherein the moveable tread portion (18) is selected to be in the retracted position and withdrawn from contact with the road surface (44) yielding no ground-contact patch and the weight of the vehicle being disposed by ground contact with only the non-moveable tread potions (20) yielding two non-moveable ground-contact patches (38). In this mode, the total ground-contact patch has substantially less area than the footprint area and the tire in the present mode of operation offers less braking traction but substantially lower rolling resistance and higher resistance to the hydroplaning phenomenon.

Figure 5:
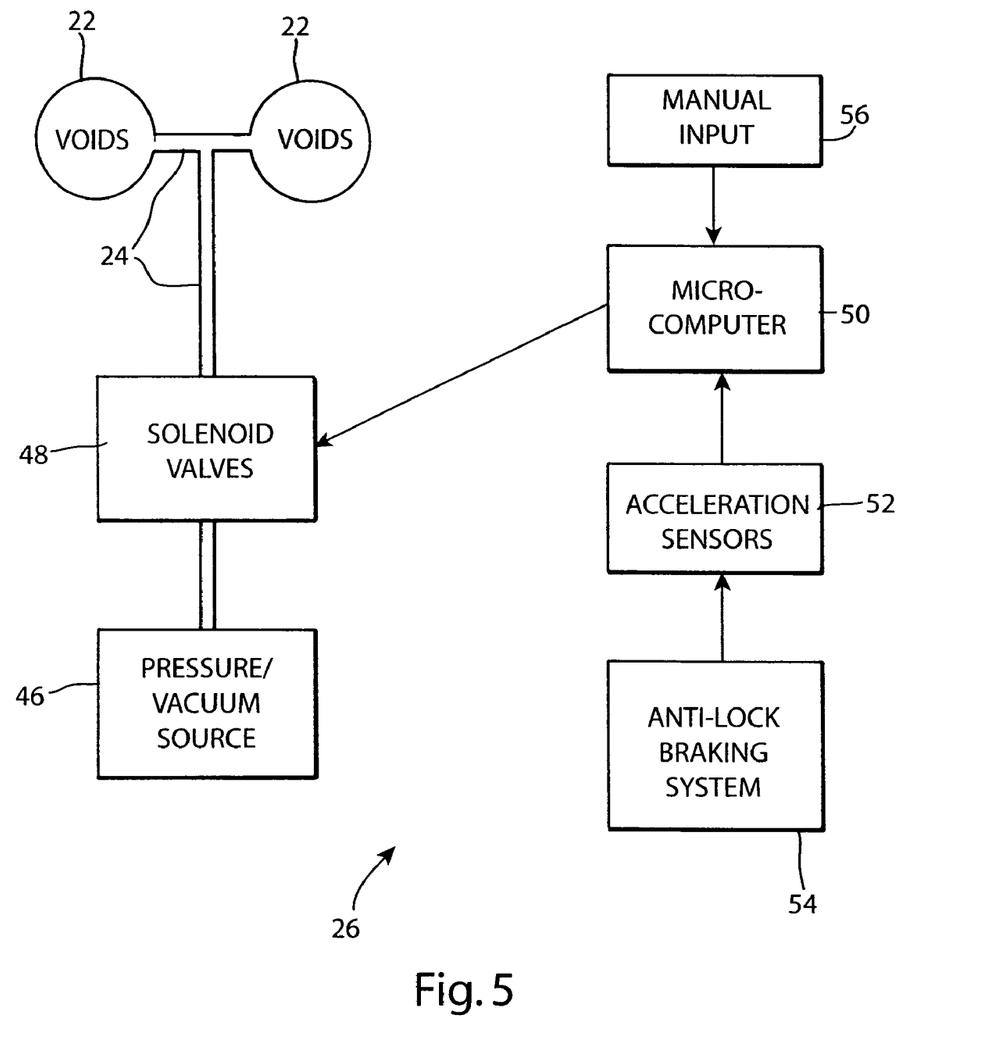
FIG. 5 is a schematic diagram of the tire control system.

FIG. 5 is a schematic diagram of the tire control system (26) including a means for selectively controlling pressure or vacuum as communicated to the said expansion voids (22) contained within the moveable portion of the tire (18) communicated with pressure/vacuum source (46) which may be an air or hydraulic pump or accumulator further in communication with a series of solenoids or valves (48) that in turn is in communication with a pressure conduit (24) wherein said pressure or vacuum is supplied to the expansion voids (22). The operation of the said solenoid valves (48) allowing pressure to the pressure conduit (24) may be controlled by a decision logic algorithm software contained and made operational by a micro-computer (50) responsive to electronic signals from various tire rotary speed and digital data accelerometers, sensors (52), and in one embodiment of the present invention, from digital signals from the vehicle's ABS (Anti-skid Braking System) (54). The vehicle operator may desire input by a manual input device (56) which may be a switch, to communicate electronic signals to the micro-computer (50) within the tire control system (26) in order to change the tire's operating mode to effect handling and safety considerations. Some devices in the tire control system (26) require electrical supply (not shown).

The present invention is suitably applied to a pneumatic tire for passenger cars, but it is also possible to apply the invention to applications for RV, light-truck, light-van, heavy truck, aircraft and the like.

The present invention is not restricted to the specific disclosure of the specification and drawings, but also encompasses any modifications within the scope of the appended claims and the disclosed invention is not limited to the specific illustrative details that appear above. Other variations and modifications are equivalent for the stated and illustrated functions without departing from the spirit or scope of the invention as defined by the claims.

Accordingly, the disclosed improved tire with a selectively moveable tread portion as disclosed within to reduce rolling resistance is simplified here as an apparatus which provides an effective, safe, inexpensive, and efficient method to achieve all the enumerated objectives, provides for eliminating difficulties encountered with prior devices, and solves problems and obtains new results in the art.

In the foregoing description, certain terms have been used for brevity, clearness, and understanding; but no unnecessary limitations are to be implied therefrom beyond the requirement of the prior art, because such terms are used for descriptive purposes and are intended to be broadly construed. Moreover, the description and illustration of the disclosed invention is by way of example, and the scope of the invention is not limited to the exact details shown or described.

What is claimed is:

1. A system for reducing rolling resistance comprising:
    a low fuel consumption vehicle tire comprising a tread having adjacent tread portions and voids contained within a crown area of the tire wherein at least one tread portion is selectively moveable with respect to the remainder of the tread in order to come in contact with or withdraw from contact with ground;
    a pressure/vacuum source in communication with the voids for increasing or decreasing the volume of the voids;
    tire control system comprising means for controlling the pressure/vacuum source to control the amount of pressure supplied to the voids such that when the pressure in the voids is increased, the volume of the voids increases and the at least one movable tread portion extends and comes into contact with the ground and when the pressure in the voids is decreased, the volume of the voids is decreased and the at least one moveable tread portion retracts and withdraws from contact with the ground; and
    sensors for detecting acceleration forces wherein when minimal acceleration forces are detected by the sensors, the tire control system lowers pressure in the voids to lower the moveable tread portion such that the tire has a smaller ground contact area and so that the tire has lower rolling resistance.

2. The system for reducing rolling resistance of claim 1 wherein the remainder of the tread comprises a pair of non-moveable tread portions.

3. The system for reducing rolling resistance of claim 2 wherein the non-moveable tread portions comprise a rubber material harder than the rubber material of the at least one moveable tread portion.

4. The system for reducing rolling resistance of claim 2 wherein the tread comprises circumferential grooves continuously extending in a circumferential direction wherein the moveable tread portion and the non-moveable tread portions are separated by the circumferential grooves.

5. The system for reducing rolling resistance of claim 1 wherein the pressure source is a pneumatic pressure source.

6. The system for reducing rolling resistance of claim 1 wherein the pressure source is a hydraulic pressure source.

* * * * *